March 3, 1970  A. C. RUGE  3,498,118
SELF-HEATING COMPENSATION FOR BONDED FILAMENT
STRAIN GAGE TRANSDUCERS
Filed Dec. 23, 1966  2 Sheets-Sheet 1
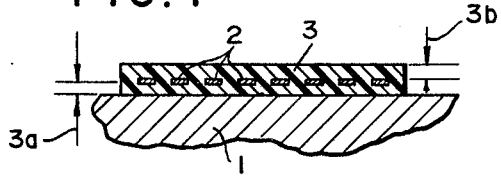
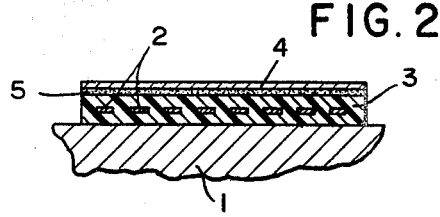
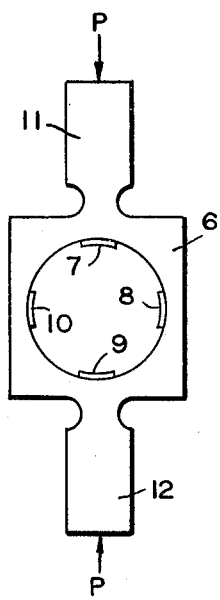
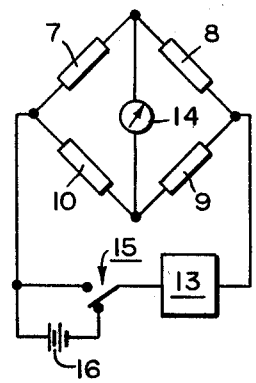
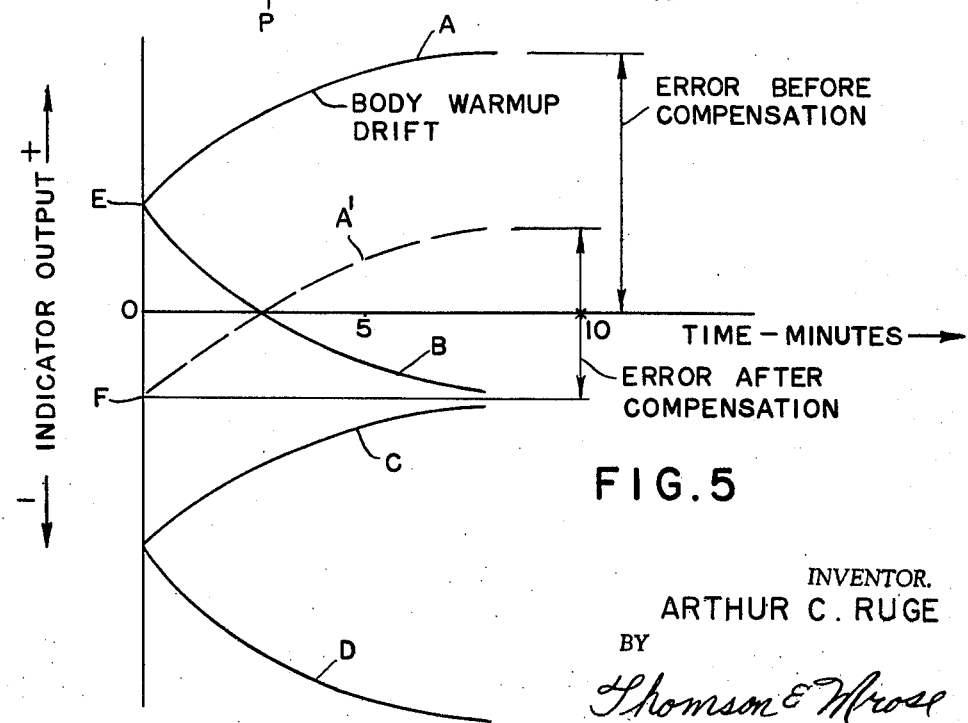
INVENTOR.
ARTHUR C. RUGE
BY
Thomson & Mrose
ATTORNEYS March 3, 1970  A. C. RUGE  3,498,118
SELF-HEATING COMPENSATION FOR BONDED FILAMENT
STRAIN GAGE TRANSDUCERS
Filed Dec. 23, 1966  2 Sheets-Sheet 2

INVENTOR.
ARTHUR C. RUGE
BY
*Thomson & Mrose*
ATTORNEYS

United States Patent Office 3,498,118
Patented Mar. 3, 1970

3,498,118
SELF-HEATING COMPENSATION FOR BONDED FILAMENT STRAIN GAGE TRANSDUCERS
Arthur C. Ruge, Lexington, Mass., assignor to BLH Electronics, Inc., Waltham, Mass., a corporation of Delaware
Filed Dec. 23, 1966, Ser. No. 608,060
Int. Cl. G01n 3/00
U.S. Cl. 73—88.5                9 Claims

ABSTRACT OF THE DISCLOSURE

Self-heating zero drift of bonded filament strain gage rtansducers is ffected by thermally-conductive material, preferably in the form of a slitted metal foil, adhesively secured atop one of the bridge-connected transducer gages in position to reduce zero drift of the bridge output and to minimize its constraint of the gage.

---

This invention relates to improvements in the compensating for the self-heating "zero drift" of bonded filament gages are applied as condition sensors, the gages being arranged in a circuit (usually a Wheatstone bridge) so that the circuit output voltage is responsive to the condition while being substantially "self-compensated" for uniform changes in temperature of the transducer. Examples of such transducer arrangements are found in my U.S. Patents Nos. 2,392,293; 2,322,319; 2,400,467; and 2,561,318 among others. Some of my U.S. patents dealing with various aspects of thermal compensation are Nos. 2,334,843; 2,344,642; 2,350,972; 2,672,048; 2,801,388; and 3,178,938.

In the usual case, the transducer manufacturer is concerned only with compensating for zero drift of the transducer under varying ambient temperatures, where the whole transducer is more or less uniformly heated or cooled in response to ambient conditions. The techniques for doing this are well established and quite effective. The effects of ambient temperature on the individual strain gages are balanced one against another in the circuit so that only accidental differences between the thermal responses of the several gages to ambient temperature change affect the circuit balance, and artificial compensation is inserted in the circuit, usually in the form of temperature-sensitive resistors, to make up for any accidental unbalance that may exist. The self-heating zero drift with which the present invention is concerned is of a distinctly different kind and cannot be corrected by the conventional methods used for compensating against ambient temperature changes. This problem comes about by the localized heating of the strain gages which results from unavoidable dissipation of power produced by the current flowing through them. The effect is quite independent of the ambient temperature response of the gage circuit, the self-heating power dissipation being superimposed upon the gage response to the ambient condition whether it be hot or cold. Further, because the self-heating effect is highly localized, it tends to produce "hot spots" at the gages which upset the uniform temperature distribution resulting from a steady ambient temperature condition where self-heating is absent. A transducer which is perfectly compensated for ambient temperature changes may nevertheless exhibit quite unacceptable errors due to the self-heating effects, and vice versa. The self-heating zero drift is found to be recoverable and repeatable.

One of the objects of the present invention is to compensate for self-heating zero drifts in strain gages by providing means for augmenting the flow of heat from one or more selected gages outwardly from the transducer body, thereby desirably altering the normal instantaneous self-heating zero drift.

Another object is to provide unique and improved techniques for accomplishing such compensation in a simple, practical manner at small or negligible cost.

A further object is to provide novel and useful forms of strain-gage compensating elements which are inexpensive, highly effective, and easy to apply, and which offer negligible constraint against normal action of the strain gage to which it is applied while nevertheless affording adequate drying area for the cementing medium.

By way of a summary account of practice of this invention in one of its aspects, a strain gage transducer, having the usual bonded filament strain gages is prescribed locations upon surfaces of the transducer body and interconnected in an appropriate AC bridge circuit relationship, is electrically excited and stepped in voltage to produce a predetermined self heating of the gages. Observed shifts in output indications are taken to characterize the amount of corrective cooling required for certain of the gages, and these are then compensated by adhesively applying to at least part of their exposed surfaces one or more thin and flexible thermally-conductive coverings. In a preferred compensation, the coverings are each in the form of a foil grid, with the spaced grid elements disposed transversely to the conductive gage elements, and the adhesive being somewhat flexible and/or subdivided in to a discontinuous pattern of minute stripes or the like.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 represents a cross-section of a foil-type strain gage bonded to a transducer body and subject to errors induced by self-heating effects;

FIGURE 2 illustrates the same gage associated with a superimposed adhesively-applied compensating member;

Figure 6:
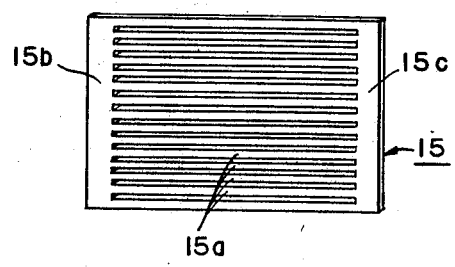

FIGURE 3 portrays a ring-type transducer wherein the cooperating strain gage bridge circuitry will advantageously exploit the compensations of the present invention;

FIGURE 4 depicts schematically the bridge circuitry and associated indicator and controllable excitations used in effecting compensations for self-heating difficulties;

FIGURE 5 graphically represents typical responses of the network of FIGURE 4;

FIGURE 6 is a pictorial illustration of a miniature compensation grid; and

Figure 7:
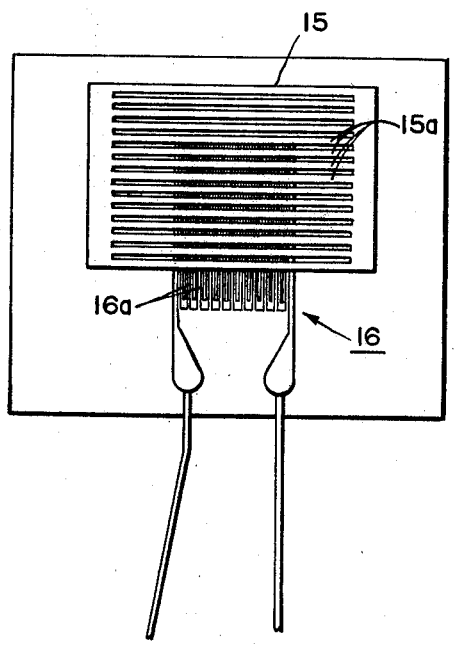

FIGURE 7 illustrates a typical superimposed miniature strain gage and cooperating compensating grid.

If all the gages in the properly arranged transducer circuit were precisely alike in their response to self-heating there would be no problem because they would compensate each other just as they can be made to do for ambient temperature effects. But the response of an individual gage to self-heating is complicated by a number of factors which are difficult or impossible to control with sufficient precision. Consider first a typical bonded filament gage applied to a body assumed to be of "infinite" extent as illustrated in cross-section in FIGURE 1. The body 1 may be of steel, for example, and, relative to the small power dissipated in the gage, may be regarded as an infinite heat sink. The gage filaments 2 are separated from the body by a thickness $3a$ of the bonding material 3 which is both electrically and thermally insulating, and they are separated from the ambient medium above by another thickness, 3b, of the insulating material 3. If power is applied to the gage, there is a nearly instantaneous "jump" in the temperature of the filaments, which are in this case held at substantially constant length by the bonding material 3, with the result that the filament is put into a state of compression by the amount it would expand if free to move. The "instantaneous" resistance change is equal to the sum of (1) the resistance change due to the temperature coefficient of resistance of the free filament in response to self-heating, and (2) the change in resistance due to the strain-sensitivity ("gauge factor") of the filament in response to the compressive strain acting on it. Because either the temperature coefficient or the gage factor may be either positive or negative, depending on the filament material selected, the two effects may add or subtract and the net result may be either an increase or decrease in resistance. In a modern transducer gage, the insulating thicknesses 3a and 3b are each less than two mils thick, which results in a time constant of a few milliseconds, with the result that the "instantaneous" resistance change occurs so quickly that as a practical matter there is no appreciable time lag between resistance change and input power voltage change. The greater part of the heat input to the gage flows through lower thickness 3a into infinite heat sink 1, which, being infinite, remains at its original temperature except locally. The remainder of the heat flows through upper thickness 3b and is transmitted by radiation to the surroundings or by convection to the air or other medium around the gage.

It is helpful at this juncture to consider the factors which militate against uniform response of the gages to self-heating. To begin with, the temperature coefficient of resistance of the filament material is uncontrollably variable to a small extent from gage to gage—even gages made from adjacent portions of the filament material will show some variation in this respect—and, in production gages, the variations will be considerably greater as larger amounts of material are involved. Selection of gages ("matching") is awkward and expensive and not a complete answer anyway, as will next be seen. Importantly, the thickness and thermal conductivity of upper and lower thicknesses or layers 3a and 3b cannot be controlled precisely by any known means, with the result that the "instantaneous" temperature change is bound to vary somewhat from gage to gage. Careful control of this factor indeed helps and is employed, but, where high precision is required, something more needs to be done to offset differences in gage response to self-heating.

The self-heating effects treated here are normally quite small and, for some purposes, could be neglected; however with advancing technology, the requirements for ever-increasing accuracy of measurement have called for greater and greater attention to which otherwise might simply be considered "second-order" errors. The magnitudes involved may be appreciated by considering a current specification of one major load cell user which may be stated numerically as follows: given a 350-ohm four-arm strain gage bridge type of load transducer, variation in power supply of ±15% from nominal 12 volt operation shall not cause a zero drift greater than ±.007% of full scale output. While such a drift appears very small at first thought, it would amount to .07% of actual load at 10% of full scale and can therefore seriously limit the useful range of precision transducer if not controlled carefully. With the compensation offered by the present invention, the actual drift can easily be held to less than one fourth of this figure in routine factory production.

If the strain gage circuit were always to be operated at a fixed input voltage, there would be little problem resulting from self-heating effects, provided sufficient warmup time can be allowed after power is turned on for the temperature conditions to stabilize in the transducer. However, it is often desirable or necessary to employ an unregulated source of input voltage which may vary, say, 15 or 20 percent, sometimes slowly, sometimes suddenly, with the result that the self-heating of the gages may vary some 30 or 40 percent (being a function of the square of the voltage). Where precise measurements are required, such variations of input voltage can render an otherwise substantially perfect transducer almost useless since the self-heating errors are in the nature of a random "noise" masking small condition-responsive signals or signal changes. Further, even if a fixed input voltage is used, it is sometimes impossible or impractical to wait out the necessary warmup time for thermal stability to set in. In such cases, an otherwise substantially perfect transducer may again be rendered useless due to "warmup drift" during the period when precision measurements are required.

A preferred practice of this invention is characterized in FIGURE 2, where a thin layer 4 of thermally conductive material is applied across the strands of the gage so that the heat reaching this layer is "spread out" substantially uniformly across the width of the gage, thus acting as a heat sink and providing a substantially greater area for radiation and conduction of heat away from the gage toward the surrounding air. The result is that the operating temperature of the filament is lowered and the amount of such lowering may be regulated by (a) choice of the thickness and thermal properties of layer 4, and (b) choice of the amount of the surface area of the gage that is covered by layer 4. I have found that there is an acceptable latitude for the thermal properties of layer 4 and that a wide choice of materials exist for present purposes. By way of example, a mixture of room temperature-setting silicone rubber paste and metal powder yielded a substantial cooling effect when trowelled on thinly. The resiliency of the rubber mix is advantageous in that there is no appreciable constraint on the gage. The amount of cooling was easily adjusted by varying the thickness of the coat and the amount of surface area of the gage grid to which it was applied. Conductive silver or carbon paint was another material found practical and easy to apply for compensation purposes.

For larger compensating effects, I have found metal foils, especially aluminum and copper foil, to be particularly effective. To obtain good thermal contact and to hold the foil in place, I preferably employ an adhesive, such as the material commercially available as "Duco Household Cement," which permits the foil to be slid around on the gage until the desired amount of grid is covered. By squeezing the foil against the gage with the finger, a very thin cement layer, 5, results with negligible thermal resistance. I have found that ordinary aluminum foil in thickness of ½ to 1½ mils made up in one or more layers in very satisfactory; the thicker the foil, and the more gage area covered, the greater will be the cooling action. The technique for performing the compensation is advantageously very simple. The transducer circuit is preferably connected into a conventional AC type strain indicator which applies a relatively low AC voltage to the bridge circuit and gives an initial unbalance reading. A D.C. battery of suitable voltage is then switched in series with the AC indicator power, thus producing a predetermined step in self heating of the gages. The AC indicator now reads the new unbalance resulting from accidental or other differences in self-heating response of the gages in the circuit. If the shift in reading is beyond allowable tolerance, the operator notes the direction and determines which gage or gages require corrective cooling. This he does by experience, which can be gained readily by the simple expedient of holding a warm soldering iron near the gage in question and observing the direction of response to this simulated self-heating. By experience or by instruction, the operator knows, from the magnitude of the observed self-heating shift, what foil thickness or coating thickness and what material will be appropriate. He then applies the cooling medium over increasing portions of the gage surface until operation of the D.C. battery switch gives a satisfactory within-tolerance indication. As a practical matter, it was found that, given normal tolerances, an operator very soon could compensate within tolerance on the first try with no adjustment, and the instrument was used merely as a check on the result. The time involved is normally a few seconds per transducer.

The above-described technique is very simple and fast where the transducer is sufficiently massive as to act as an infinite heat sink or nearly so; in other words, where the body temperature of the transducer remains substantially constant and uniform despite the self heat applied to the gages. In cases where the body is not sufficiently massive to serve as a substantially infinite heat sink, the phenomenon is more complex. The "instantaneous" change occurs as has been described, but, as the heat input reaches the boundaries of the carrier body, the body itself begins to warmup appreciably and the gage resistance change approaches a new steady state which may require seconds or minutes to achieve. This may give rise to a further zero drift the effect of which may be minimized by (a) using the principles of the invention to offset the "instantaneous" zero shift so as to divide the slow body-warmup error preferably equally into plus and minus drifts, and (b) by choice of filament material temperature coefficient to minimize the magnitude of the drift caused by body warmup. A practical example of such a problem is illustrated in FIGURE 3 where load transducer 6 is in the form of a steel ring-shaped element (such as that of U.S. Patent No. 2,561,318) having diametrically spaced gages 7, 8, 9, 10 responsive to alternate tension and compression strains due to bending in response to the loading P. The gages are normally connected in an AC bridge circuit such as shown in FIGURE 4, involving the usual power source 13 and indicator 14, in which the load responses are caused to be additive while the responses to uniform temperature change tend to be self-compensating. Switch 15 permits the desired D.C. supply 16 to be introduced for purposes of establishing voltage stepping.

The effect of self heating in a small ring of this type (say, one adapted to measure a 1000 pound force) is as follows, the mass of the ring 6 here being low relative to the power dissipated in the gages. The ring will in time warmup appreciably above ambient temperature when maximum input power is applied. But, since the structure is not identically symmetrical about both axes, there will be a greater self-heating temperature at gages 8 and 10 than at gages 7 and 9, the latter gages being more cooled through the end-piece heat sinks 11, 12. The observed response of the circuit of FIGURE 4 to application of the testing power to the bridge will resemble one of the curves A, B, C, D of FIGURE 5, which one depending upon the particular set of conditions which may apply in a given instance. In one case, it is assumed that curve A applies and that the steady state condition is out of allowable tolerance. Using the compensating principles of this invention, the operator applies thermally-conductive coating or coatings to at least a portion of such gage or pair of gages as will move the "instantaneous" self-heating offset from point E to a point such as F, so that the slow body-warmup drift error is divided into plus or minus error, or at least to a point where the total error is at all times allowable.

A particularly advantageous and easily-handled form for the compensating material in this invention is illustrated in FIGURE 6 which shows a slitted thermally-conductive foil member 15 having narrow and flexible spaced parallel grid or slat elements 15a integral with one another along the edges 15b and 15c. FIGURE 7 portrays this member placed with the slats 15a transverse to the strands or filaments 16a of the gage 16 (FIGURE 7). The element covers only such portion of the gage as needed for compensation. The strips or slats of foil may be cut or alternatively readily formed by the known etching methods employed in foil strain gage manufacture and they may be adhesively attached only at spaced staggered intervals to lend strength to the element during handling. The advantages of this "Venetian Blind" type of grid element are: (a) very little constrain exists against the normal strain response of the gage elements, (b) the cementing medium has adequate drying surface available for quick curing. As with plain foil cooling elements, these slitted elements can be placed one atop the other for augmented effect. With either type of foil element (plain or slitted) the cementing medium 5 is preferably of a known highly plasticized or "rubbery" form (such as a silicone-base adhesive) so as to merely establish adequate contact and bond without offering appreciable restraint to the normal action of the strain gage. This is especially important in transducers employing thin bending sections at sites of the sensing gages. For direct-stress sections such as simple load columns the restraint of a plain 1 or 1 ½ mil aluminum foil cemented with the aforementioned Duco Household Cement has proved to be negligible, but the slitted element is preferable because of its quick-drying properties.

It will be seen that I have provided a very effective and easily-practiced compensation for self-heating errors which have hitherto lacked any means of correction—for example, the manufacturer previously would control his processes as closely as practical and then either accept the final result or rework the transducer in the hope of realizing a better result the next time. While I have described certain specific embodiments and techniques, these have been presented by way of disclosure rather than limitation, and it should be obvious to those skilled in the art that various modifications, combinations and substitutions may be effected without departing in spirit or scope from this invention in its broader aspects.

What I claim as new and desire to secure by Letters Patent of the United States is:

1. The method of compensating the self-heating zero-drift of electrical strain gage transducers of the type wherein bonded filament strain gages are mounted in relation to surfaces of deformable transducer members and interconnected to form a measurement circuit, which comprises determining the zero drift of the measurement circuit induced by differences in the self-heating characteristics of the various gages, selecting at least one gage which requires corrective cooling, adhesively bonding thermally-conductive metallic material to at least part of the exposed surface of the selected gage in intimate heat-transfer relationship with the exposed surface of the gage, and limiting the amount of said material and the area of the exposed gage surface to which it is applied to those values establishing a predetermined flow of heat through the material and a predetermined change in the zero drift of the transducer.

2. The method of compensating the zero drift of electrical strain gage transducers as set forth in claim 1 wherein said thermally-conductive material is in the form of a relatively thin and flexible broad-area metallic foil, comprising the further step of forming slits in the foil which separate at least a portion thereof into a plurality of substantially parallel grid elements, and thereafter applying the slitted foil to the said area of the exposed gage surface with the grid elements disposed substantially transversely to the filaments of the gage.

3. The method of compensating the self-heating zero drift of electrical strain gage transducers as set forth in claim 2 wherein the step of forming the slits in the foil includes forming the foil with integral-interconnecting portions securing the grid elements together in a laterally spaced substantially parallel relationship.

4. The method of compensating the self-heating of electrical strain gage transducers as set forth in claim 1 wherein the step of adhesively bonding the thermally-conductive material with the exposed surface of the gage includes bonding with an adhesive which is plasticized and thereby imparts relatively low constraint to the gage.

5. The method of compensating the self-heating zero drift of electrical strain gage transducers as set forth in claim 1 wherein the step of determining the zero drift comprises applying electrical excitation to the circuit and sensing the direction and amount of zero drift then occuring in the electrical output of the circuit, and wherein the step of adhersively bonding the thermally-conductive material to at least one of the gages in the circuit is effective to reduce the zero drift in the electrical output upon increase in the flow of heat through the applied material.

6. The method of compensating the self-heating zero drift of electrical strain gage transducers as set forth in claim 5 wherein the application of electrical excitation includes abruptly switching a source of direct current into exciting relationship with the circuit.

7. The method of compensating the self-heating zero drift of electrical strain gage transducers as set forth in claim 5 wherein the application of electrical excitation includes applying alternating current excitation to the circuit, and wherein the sensing includes sensing the drift in alternating current electrical output of the circuit.

8. The method of compensating the self-heating zero drift of electrical strain gage transducers as set forth in claim 5 wherein the step of selecting at least one gage which requires corrective cooling comprises sensing the zero drift while simultaneously applying heat externally to at least one and less than all of the gages in the circuit.

9. Strain gage transducer apparatus compensated for self-heating zero drift, comprising a plurality of bonded filament strain gages connected in bridge circuit relationship, means mounting said gages upon a deformable transducer member and establishing predetermined heat-transfer relationships between said member and the filaments of said gages, thermally-conductive metallic material coating at least part of the exposed surface of at least one of said strain gages in amount and to an extent which established a predetermined greater flow of heat outwardly therethrough than flows outwardly from at least one other of said gages, said one of said gages being at a location in said bridge circuit relationship wherein self-heating zero drift in the electrical output of said circuit relationship is reduced, said thermally-conductive material comprising relatively thin broad-area metallic foil material, said gages including electrically-insulating material bonding the filaments thereof together in a substantially planar relationship and thinly covering both sides thereof, and thinly-distributed adhesive securing said foil material in intimate heat-transfer and substantially coextensive relationship with at least a portion of the exposed surface of said bonding material on the exposed side of said one of said gages.

References Cited

UNITED STATES PATENTS 2,363,181 11/1944 Howland _____ 201—63
3,372,733 3/1968 Callender _____ 165—1

OTHER REFERENCES

Strain Gage Readins, vol. III, No. 3, pp. 3–7, ibid, vol. V, No. 5, pp. 23–26.

CHARLES A. RUEHL, Primary Examiner

U.S. Cl. X.R.

338—3